(12) United States Patent
Sato

(10) Patent No.: US 8,757,330 B2
(45) Date of Patent: Jun. 24, 2014

(54) PNEUMATIC DISC BRAKE DEVICE FOR RAILWAY ROLLING STOCK

(75) Inventor: Yoshi Sato, Sanda (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 220 days.

(21) Appl. No.: 13/292,348

(22) Filed: Nov. 9, 2011

(65) Prior Publication Data

US 2012/0067677 A1    Mar. 22, 2012

Related U.S. Application Data

(63) Continuation of application No. PCT/JP2010/058088, filed on May 13, 2010.

(30) Foreign Application Priority Data

May 14, 2009  (JP) .................... 2009-117176

(51) Int. Cl.
*B60T 11/10*    (2006.01)
*F16D 55/224*    (2006.01)

(52) U.S. Cl.
USPC .................... 188/153 R; 188/106 F; 188/72.6

(58) Field of Classification Search
USPC ............... 188/72.3, 72.6, 72.9, 106 F, 106 P, 188/151 R, 153 R
See application file for complete search history.

(56) References Cited

U.S. PATENT DOCUMENTS

| 3,465,981 | A | * | 9/1969 | Graham | .................... | 242/422.2 |
|---|---|---|---|---|---|---|
| 4,132,292 | A | * | 1/1979 | Dufresne | ...................... | 188/171 |
| 4,174,025 | A | * | 11/1979 | Ivachev | ......................... | 188/72.6 |
| 5,813,499 | A | | 9/1998 | Staltmeir et al. | | |
| 8,016,081 | B2 | * | 9/2011 | Weinberger et al. | .......... | 187/393 |

FOREIGN PATENT DOCUMENTS

| JP | 49-42382 | 4/1974 |
|---|---|---|
| JP | 2-11759 | 1/1990 |
| JP | 2-58129 | 4/1990 |
| JP | 2008-296756 | 12/2008 |

* cited by examiner

*Primary Examiner* — Christopher Schwartz
(74) *Attorney, Agent, or Firm* — Clark & Brody

(57) ABSTRACT

A pneumatic disc brake device for a railway rolling stock which can produce two times the conventional braking force when the brake cylinder diameter is the same comprises first and second brake levers (1, 2), a pair of brake pads (4) which are mounted through brake heads (5) at one end of the brake levers so as to oppose to a brake disc, and a brake cylinder (6) disposed between the other ends of the first and second brake levers, wherein the brake cylinder (6) comprises a first cylinder part (6*a*) and a second cylinder part (6*b*) disposed in series.

2 Claims, 3 Drawing Sheets

PNEUMATIC DISC BRAKE DEVICE FOR RAILWAY ROLLING STOCK

TECHNICAL FIELD

This invention relates to a pneumatic disc brake device used on a railway rolling stock. A disc brake device according to the present invention can generate a larger braking force than a conventional device.

BACKGROUND ART

By decreasing the size of a pneumatic disc brake device (caliper brake device) used on a railway rolling stock, it is possible to reduce the overall aerodynamic resistance of a railway rolling stock by decreasing the weight and installation space of the brake device. For this reason, there is a great need for reductions in the size of a brake device particularly for high speed railway rolling stocks.

As shown in FIG. 9 of Patent Document 1 (JP 2008-296756 A) (that figure being attached hereto as FIG. 3), a conventional pneumatic disc brake device for a railway rolling stock has a pair of brake levers 22 and a pair of brake pads 24 disposed on both sides of a brake disc 25. Each of the brake pads is mounted on a brake head 23 which is pivotably mounted on one end of a brake lever 22 such that the pad opposes the brake disc 25. A pneumatic brake cylinder 21 is disposed between the other ends of the brake levers 22. In the figure, 26 indicates a link member which connects the pair of brake levers to each other, 22a indicates the fulcrum (pivoting point) of each brake lever, 22b indicates the center of support of the brake heads, and 25a indicates the frictional surfaces of the brake disc.

At the time of brake operation, compressed air is supplied to the brake cylinder from an unillustrated compressor to extend the brake cylinder 21. As a result, a force in the opposite direction, namely a contracting force acts on the other ends of the brake levers 22 on which the brake pads 24 are mounted, through the brake levers 22 having their fulcrums 22a which are fixed in space, and the brake pads 24 are pressed against the frictional surfaces 25a of the brake disc 25, thereby generating frictional resistance between the pads and the brake disc 25 and obtaining a braking force.

With such a pneumatic disc brake device, if the maximum pressure of compressed air which can be supplied to the brake cylinder is increased, a large pressing force can be produced using a brake cylinder with a small effective diameter, and a decrease in the size of the brake cylinder and accordingly of the disc brake device can be realized.

However, the maximum pressure of compressed air which can be supplied to the brake cylinder is determined by the capacity of the compressor mounted on the railway rolling stock, and usually it is limited to at most 1 MPa. Accordingly, there is a limit to the extent to which the size of the brake device can be decreased by increasing compressed air pressure.

Patent Document 2 (U.S. Pat. No. 5,813,499) proposes a disc brake device which has the object of achieving a decrease in size by decreasing the effective diameter of a brake cylinder. However, the disc brake device proposed in Patent Document 2 uses a complicated special link mechanism so as to generate a large braking force by the lever principle. Therefore, it had the problems of an increase in cost due to an increase in the number of parts and an increase in maintenance costs.

PRIOR ART DOCUMENTS

Patent Documents

Patent Document 1: JP 2008-296756 A
Patent Document 2: U.S. Pat. No. 5,813,499

SUMMARY OF THE INVENTION

As stated above, there were limits to the extent to which the size of a pneumatic disc brake device used on a railway rolling stock could be decreased by increasing the maximum pressure of compressed air which can be supplied to a brake cylinder. Furthermore, a method of generating a large braking force by using a complicated special link mechanism had the problems of an increase in costs due to an increase in the number of parts and an increase in maintenance costs.

The object of the present invention is to provide a pneumatic disc brake device for a railway rolling stock which can generate two times the braking force compared to when using a conventional brake cylinder without using a complicated special link mechanism even when the pressure of supplied compressed air is the same as in the past and even when the diameter of a brake cylinder is a conventional value.

A pneumatic disc brake device for a railway rolling stock according to the present invention comprises a brake disc, a first and a second brake lever having fulcrums which are connected by a fulcrum linking member, a pair of brake pads which are mounted on brake heads pivotably mounted on one end of the brake levers and which are disposed so as to be opposed to the brake disc, and a brake cylinder which is disposed between the other ends of the first and second brake levers, with the brake pads being pressed against the frictional surfaces of the brake disc or released from the frictional surfaces of the brake disc by pivoting the first and second brake levers about their fulcrums due to extension and contraction of the brake cylinder, characterized in that the brake cylinder comprises two cylinder parts in series, a first cylinder part and a second cylinder part.

By disposing two brake cylinder parts in series, a pneumatic disc brake device for a railway rolling stock according to the present invention can generate a braking force which is twice as large as that obtained by a conventional disc brake device which has the same effective diameter.

In addition, when the braking force which is demanded equals to the conventional value, a brake cylinder having $(1/2)^{1/2}$ of the conventional effective diameter can be used, and it can realize a decrease in the size of a disc brake device.

MODES FOR CARRYING OUT THE INVENTION

The present invention can realize a decrease in the size of a pneumatic disc brake device for a railway rolling stock by disposing two cylinders in series.

Below, various embodiments of the present invention will be explained while referring to FIG. 1 and FIG. 2.

Figure 1:
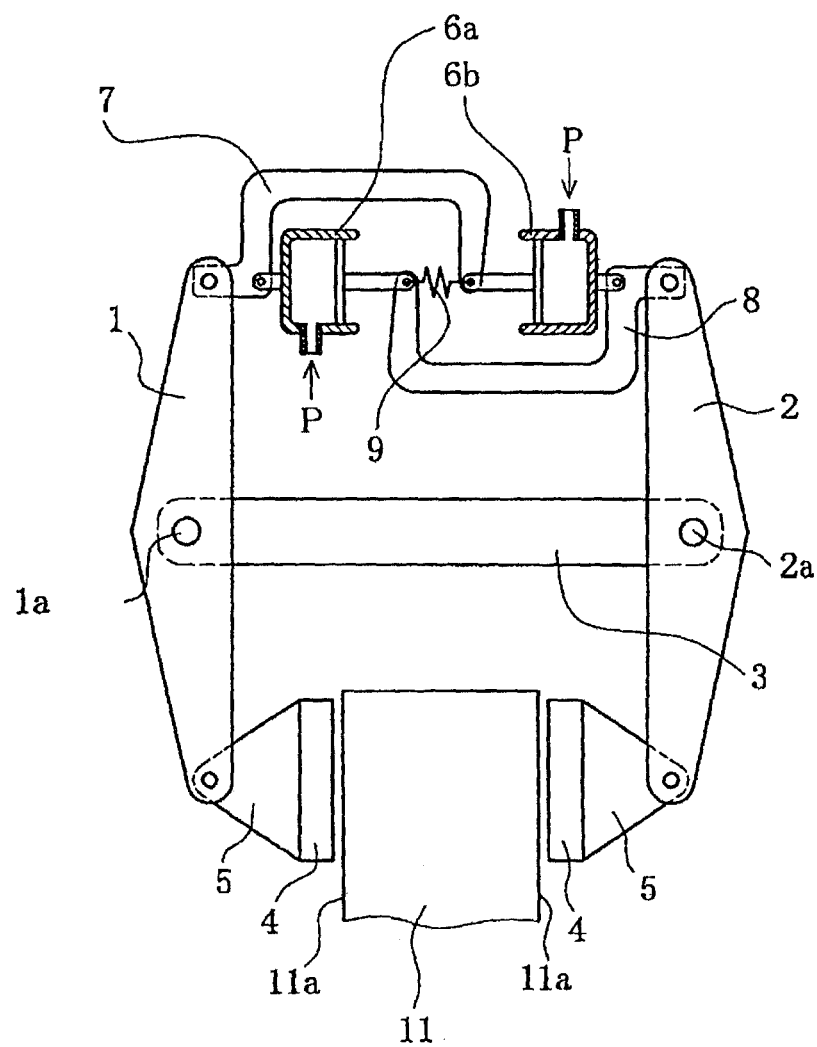
FIG. 1 is a schematic view of a first embodiment of a pneumatic disc brake device for a railway rolling stock according to the present invention as viewed from above.
Figure 2:
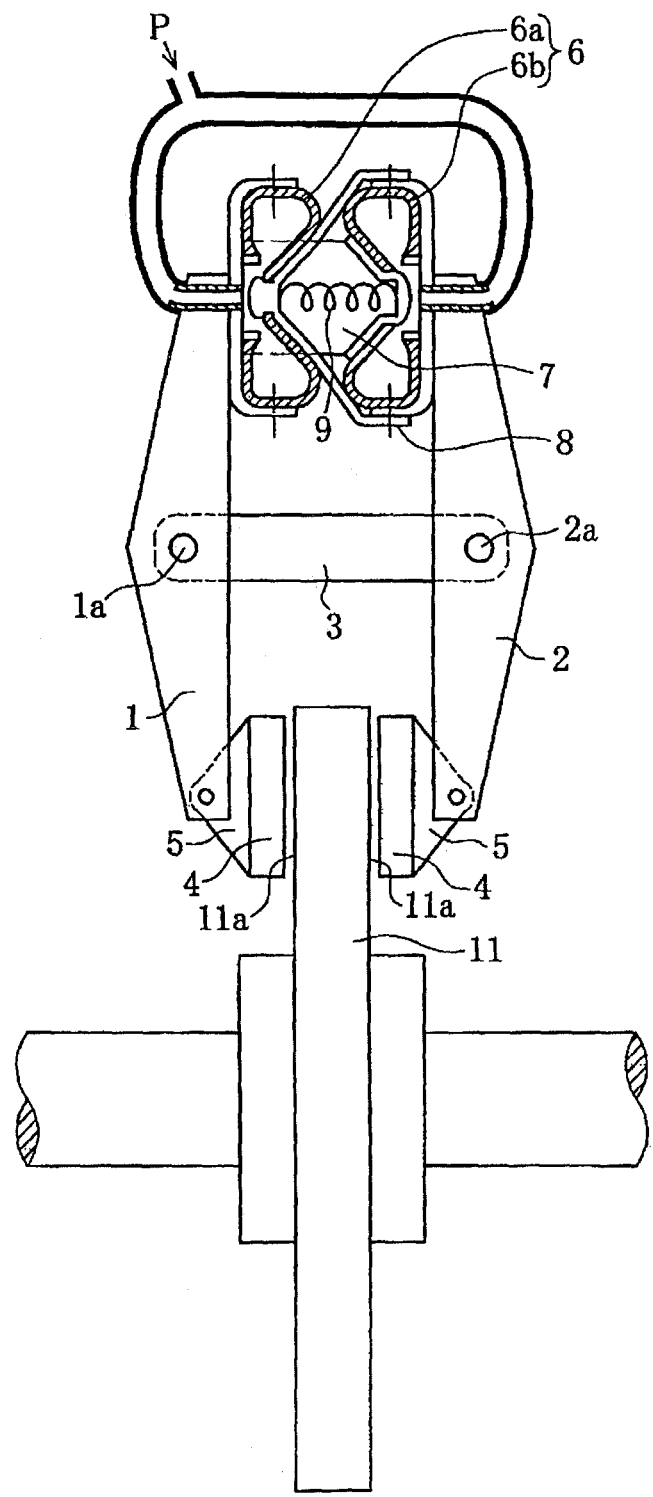
FIG. 2 is a schematic view of a second embodiment of a pneumatic disc brake device for a railway rolling stock according to the present invention as viewed from above.
Figure 3:
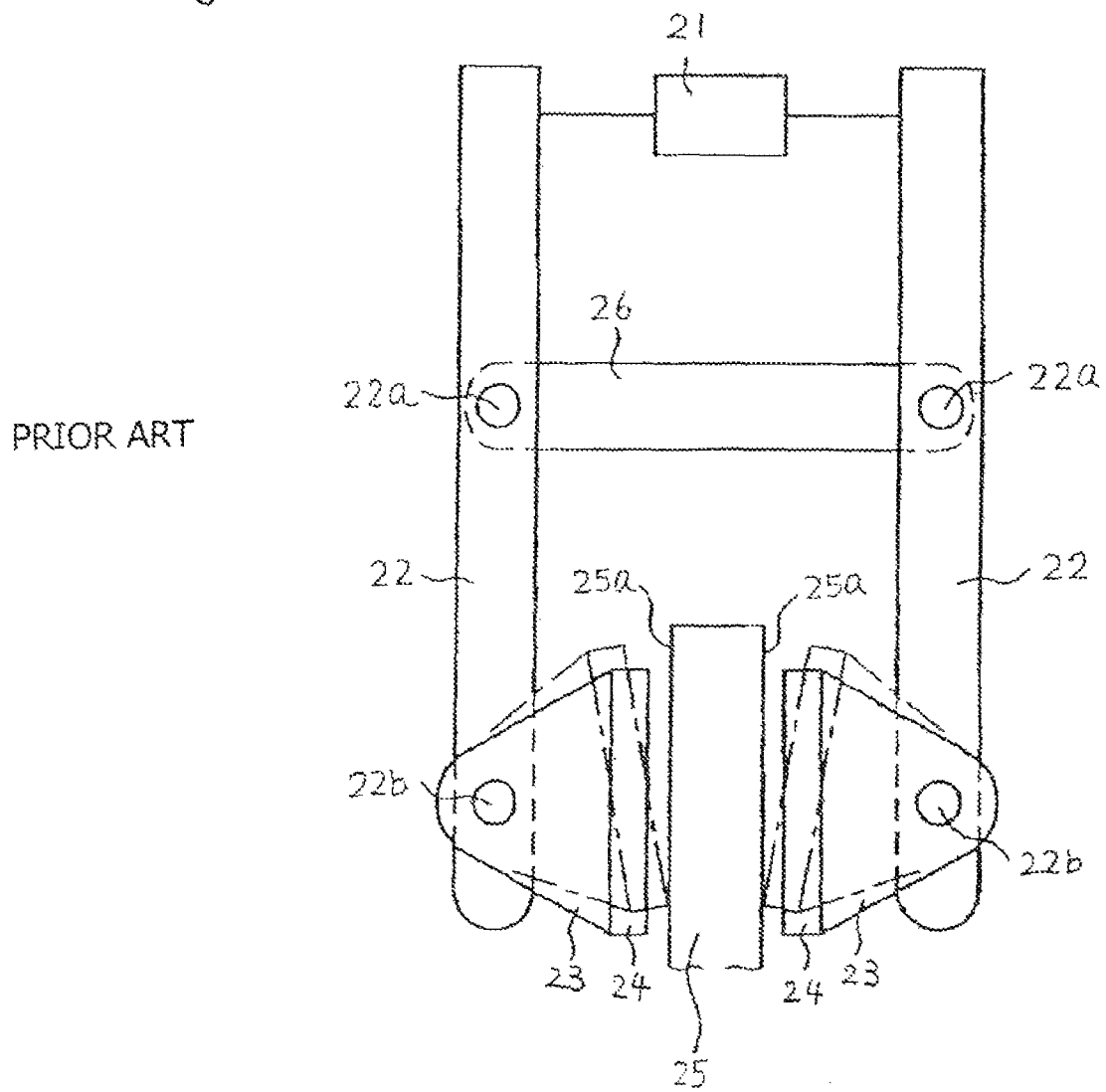
FIG. 3 is a schematic view showing a conventional disc brake for a railway rolling stock.

FIG. 1 is a view showing a first embodiment of a disc brake device according to the present invention, and FIG. 2 is a view showing a second embodiment of a disc brake device according to the present invention.

In FIG. 1 and FIG. 2, 1 is a first brake lever and 2 is a second brake lever. They are mounted in their mid portions on a fulcrum linking member 3 so that the brake levers can pivot. A brake head 5 on which a brake pad 4 is mounted is pivotably installed on one end of each brake lever, and a brake cylinder 6 which is extended or contracted by pneumatic pressure is mounted between the other ends of the brake levers. The two brake pads 4 which are mounted on the brake levers through the brake heads 5 are disposed opposite the brake disc 11 so that the brake disc can be pressed from both sides.

In a pneumatic disc brake device having this structure, the one ends of the first and second brake levers 1 and 2 (the ends on which the brake pads 4 are mounted through the brake heads 5, which will be referred to below as the first ends) are made to approach and separate from each other by pivotal movement of the levers with the mounting positions of the fulcrum linking member 3 as fulcrums (pivoting points) 1a and 2a, the movement being caused by the extension and contraction of the brake cylinder 6 which is connected between the other ends of the brake levers (referred to below as the second ends). Namely, when the cylinder 6 is extended, the first ends approach each other, and when the cylinder 6 contracts, the first ends move away from each other. As a result, the brake pads 4 are pressed against the frictional surfaces 11a of the brake disc 11 or are separated from the frictional surfaces 11a of the brake disc 11. The fulcrum linking member (or lever balancer) 3 performs the function of maintaining a constant distance between the fulcrums 1a and 2a of the pair of first and second brake levers 1 and 2 while bearing the brake reaction force acting on the fulcrums.

In the present invention, the brake cylinder 6 is constituted by two cylinder parts in the form of the first cylinder part 6a and the second cylinder part 6b. As a result, it is possible to generate a braking force which is twice as large as that obtainable with a conventional structure.

If the first cylinder part 6a and the second cylinder part 6b are arranged in parallel, installation space for two cylinders becomes necessary. Therefore, in the present invention, the first cylinder part 6a and the second cylinder part 6b are disposed in series. In FIG. 1, the first cylinder part 6a and the second cylinder part 6b are each constituted by a sliding piston and a cylinder. In FIG. 2, a first cylinder part 6a and a second cylinder part 6b are each constituted in the form of a rubber diaphragm.

In order to dispose the first cylinder part 6a and the second cylinder part 6b in series, first and second connecting members 7 and 8 are provided in the devices shown in FIG. 1 and FIG. 2.

One end of the first connecting member 7 is connected to the first brake lever 1 and to the end of the first cylinder part 6a facing to the first brake lever 1, and the other end thereof is connected to the end of the second cylinder part 6b facing away from the second brake lever 2.

One end of the second connecting member 8 is connected to the second brake lever 2 and to the end of the second cylinder part 6b facing to the second brake lever 2, and the other end thereof is connected to the end of the first cylinder part 6a facing away from the first brake lever 1.

In the devices shown in FIG. 1 and FIG. 2, a return spring 9 which restores the pivoting of the brake levers 1 and 2 when braking is released is disposed between the other end of the first connecting member 7 and the other end of the second connecting member 8 in order to reduce the size of the device. When compressed air is supplied from a compressor to the first and second cylinder parts 6a and 6b at the time of braking, the cylinder parts 6a and 6b are extended while the return spring 9 contracts and stores spring force, and the brake pads 4 which are mounted on the other ends of the brake levers 1 and 2 through the brake heads 5 are pressed against the brake disc 11 to generate a braking force by friction.

When the brake is released and compressed air is exhausted, cylinders 6a and 6b are compressed by the spring force stored in the return spring 9. The position of the return spring is not limited to the depicted position which is between the connecting members 7 and 8. By disposing a tension spring (on the cylinder side of the fulcrums of the levers) or a compression spring (on the brake pad side of the fulcrums of the levers) at desired positions on the first and second brake levers, the cylinders can be returned to their contracted state when the pneumatic pressure is released. However, disposing the return spring 9 between the connecting members 7 and 8 results in no wasted space, so it is advantageous in reducing the size of the device.

In a disc brake device according to the present invention having the above-described structure, when the brake pads 4 are pressed against the frictional surfaces 11a of the disc brake 11, two cylinders in the form of the first cylinder part 6a and the second cylinder part 6b are used, and if each brake cylinder part has the same effective diameter as a conventional brake cylinder, the braking force which is generated becomes twice as large. Explaining this point in greater detail, if there is one cylinder as is conventional, the braking force equals the difference of [cylinder force] minus [return spring force], but the braking force obtained with a disc brake device according to the present invention is equal to the difference of [cylinder force×2] minus [return spring force].

Conversely, if the desired braking force is the same as is conventional, it is possible to use brake cylinders having an effective diameter which is equal to $(1/2)^{1/2}$ that of a conventional cylinder, so the disc brake device can be decreased in size.

The present invention is not limited to the above-described embodiments, and it is of course possible to suitably modify the embodiments within the scope of the technical concept described by the claims.

Namely, it is possible to modify the structure of a pneumatic disc brake device which is known from in the past or which is to be developed in the future as long as a brake cylinder is constituted by a first and second cylinder part disposed in series. In addition, there are no particular limitations on the materials constituting each of the members of a disc brake device, and conventional ones can be used.

A pneumatic disc brake device according to the present invention is not limited to use on railway rolling stocks, and it can also be applied to a disc brake device for an automobile, a motorcycle, or the like.

EXPLANATION OF SYMBOLS 1 first brake lever
1a fulcrum (pivoting point)
2 second brake lever
2a fulcrum (pivoting point)
3 fulcrum linking member
4 brake pad
5 brake head
6 brake cylinder
6a first cylinder part

6b second cylinder part
7 first connecting member
8 second connecting member
9 return spring
11 brake disc
11a frictional surface

The invention claimed is:

1. A pneumatic disc brake device for a railway rolling stock comprising a brake disc having frictional surfaces, a first and second brake lever having fulcrums which are connected by a fulcrum linking member, a pair of brake pads which are mounted on brake heads pivotably mounted on one end of the brake levers and which are disposed so as to be opposed to the brake disc, and a brake cylinder which is disposed between the other ends of the first and second brake levers, with the brake pads being pressed against the frictional surfaces of the brake disc or released from the frictional surfaces of the brake disc when the first and second brake levers pivot about the fulcrums due to extension and contraction of the brake cylinders, characterized in that the brake cylinder comprises a first cylinder part and a second cylinder part disposed in series, further comprising first and second connecting members, wherein one end of the first connecting member is connected to the first brake lever and to an end of the first cylinder part facing to the first brake lever, and another end of the first connecting member is connected the second cylinder part facing away from the second brake lever, and one end of the second connecting member is connected to the second brake lever and to an end of the second cylinder part facing to the second brake lever, and another end of the second connecting member is connected to the end of the first cylinder part facing away from the first brake lever.

2. A pneumatic disc brake device for a railway rolling stock as set forth in claim 1 further comprising a return spring disposed between the another end of the first connecting member and the another end of the second connecting member.

* * * * *